Aug. 30, 1960 R. A. WAGNER 2,950,768
VIBRATION ABSORBING SYSTEM AND METHOD FOR
ROTARY WING AIRCRAFT BLADES
Filed Sept. 26, 1955 3 Sheets-Sheet 1
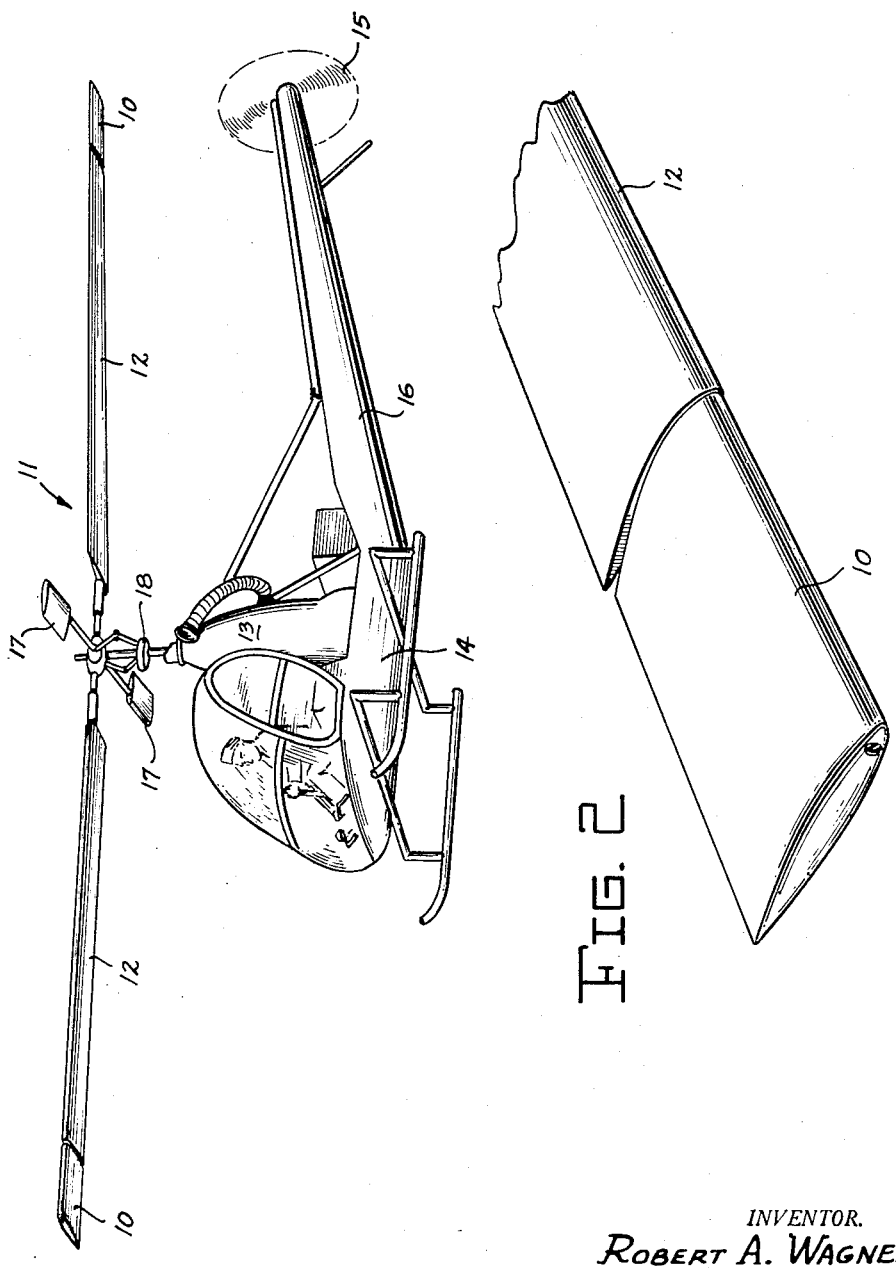
INVENTOR.
ROBERT A. WAGNER
BY
Fryer & Johnson
ATTORNEYS.

Aug. 30, 1960 — R. A. WAGNER — 2,950,768
VIBRATION ABSORBING SYSTEM AND METHOD FOR
ROTARY WING AIRCRAFT BLADES
Filed Sept. 26, 1955 — 3 Sheets-Sheet 2
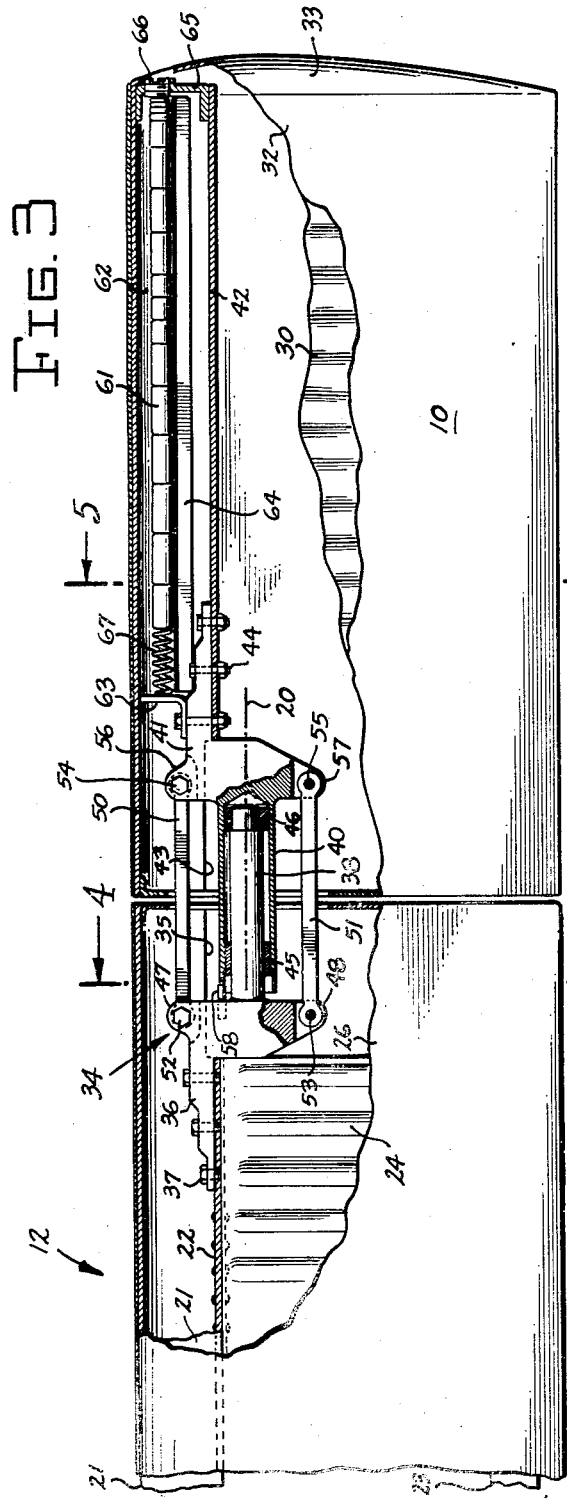
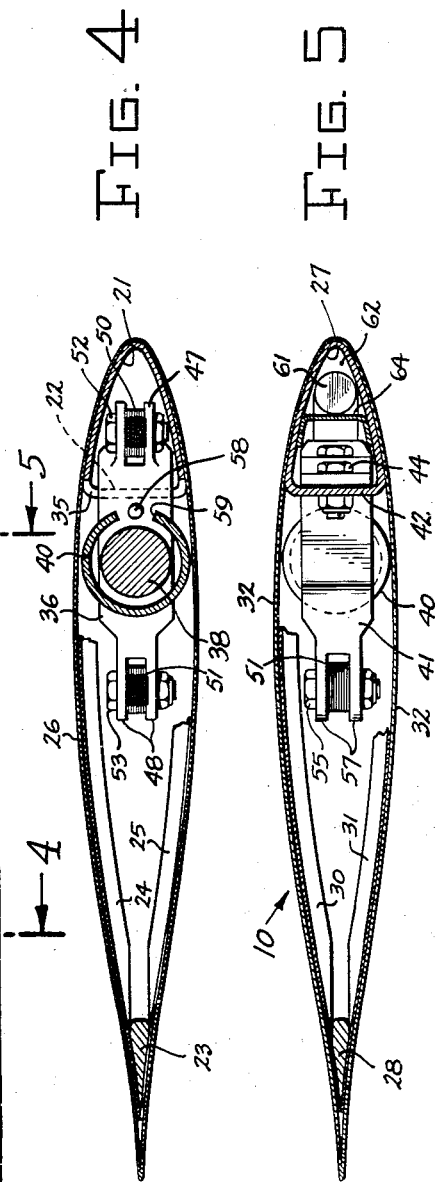
INVENTOR.
ROBERT A. WAGNER
BY
ATTORNEYS.

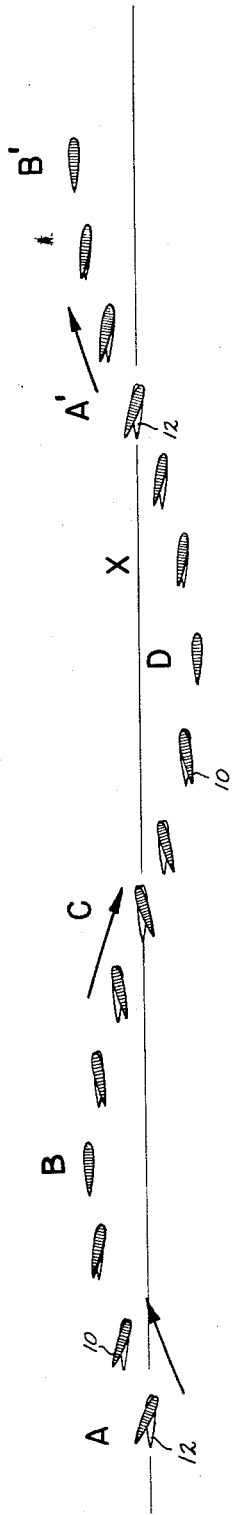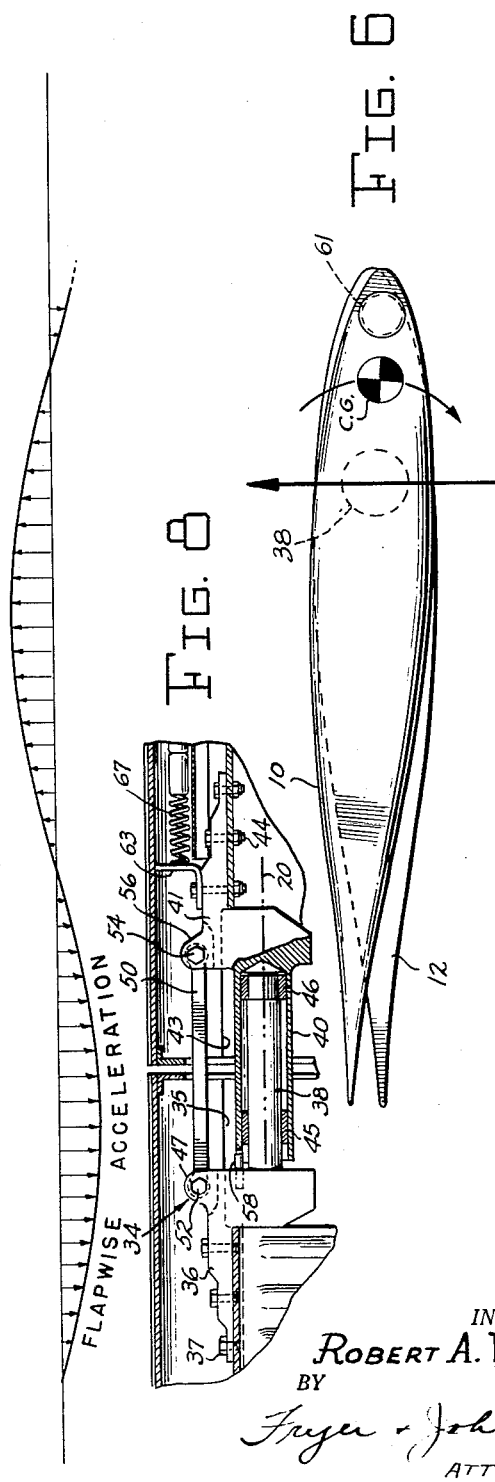

United States Patent Office 2,950,768
Patented Aug. 30, 1960

2,950,768

VIBRATION ABSORBING SYSTEM AND METHOD FOR ROTARY WING AIRCRAFT BLADES

Robert A. Wagner, Redwood City, Calif., assignor to Hiller Aircraft Corporation, Palo Alto, Calif., a corporation of California Filed Sept. 26, 1955, Ser. No. 536,325

8 Claims. (Cl. 170—160.55)

This invention relates to rotary wing aircraft such as helicopters, and pertains more particularly to a rotor blade tip-damper for absorbing and damping flapwise vibrations of rotor blades in aircraft of this general type.

The rotor blades in helicopters are normally exposed to various sources of vibration including periodic variations of air loadings. This is particularly true during forward flight when, during the course of a revolution of the rotor, each rotor blade must alternately advance and retreat with respect to the general direction of flight. The individual rotor blades thus encounter periodic variations in relative air velocity and angle of attack; and these loading variations may serve as a major source of excitation for undesirable flapwise flexing or oscillations of the rotor blades. Other possible sources of vibration include the engine and the tail rotor.

The rotor blades, due to their flexibility, have their own natural modes and frequencies of vibration, and may tend to respond to certain particular exciting input frequencies with an amplitude of motion depending upon the ratio of the exciting frequencies, to a natural frequency of the blade. When this ratio approaches unity, or low integral multiples thereof, large amplitudes of oscillation may occur unless effectively restrained by damping.

For a given rotor configuration, it will usually be found that the rotor blades will be subject to a critical flapwise oscillation occurring only at a certain particular frequency depending upon the particular structural characteristics of the blade, such as mass distribution and stiffness. If the frequency of the applied force is of the proper ratio and magnitude, dynamic amplification of the blade's natural resonant frequency may occur, and this may induce undesirable large stresses in the blade structure.

Summarizing the invention, it has as a principal object, the provision of improved means for the suppression of flapwise vibrations in a helicopter rotor blade by mounting a damper at the outboard or tip portion of the blade to counteract aerodynamically certain oscillatory flapping motions of the blade without necessarily affecting certain other of its normal flapwise motions.

It is a further object of the invention to provide an auxiliary tip-damper for a helicopter rotor blade which is elastically mounted for restrained pitchwise or in other words chordwise oscillation about a longitudinal axis with respect to the main rotor blade; its elastic restraint being so preadjusted that its natural frequency of pitchwise oscillation is substantially equal to a specific critical resonant frequency found to be inherent in the rotor blade upon which it is mounted.

Another object of this invention is to provide an auxiliary tip-damper of airfoil shape having its weight distributed in such a manner as to induce a nose-down pitching tendency of the airfoil shaped damper when the rotor blade is accelerated upwardly, and to induce a nose-up pitching tendency when the rotor blade is accelerated downwardly, thus counteracting aerodynamically undesirable fluctuations of the main rotor blade.

These and other objects and advantages of the invention will be apparent from the following description and the accompanying drawings, wherein:

Fig. 1 is a perspective view of a helicopter having blades constructed in accordance with the principles of this invention;

Fig. 2 is an enlarged perspective view of the tip portion of one of the rotor blades, and showing the tip-damper of this invention mounted thereon;

Fig. 3 is a fragmentary top plan view of the tip-damper and a portion of the main blade, partly in section and partly broken away, illustrating more clearly the construction of the internal parts;

Fig. 4 is a sectional view taken in a plane as indicated by the line 4—4 in Fig. 3;

Fig. 5 is a sectional view taken in a plane as indicated by the line 5—5 in Fig. 3;

Fig. 6 is a tip-end view of the damper illustrating how dynamic forces cause a pitch adjustment of the tip-damper.

Fig. 7 is a diagrammatic view illustrating the pitching motion of the tip-damper acting to counteract the flapwise motion of the main rotor blade at its critical frequency; and also showing, by means of the associated curve at the bottom of the figure, the direction and relative amounts of flapwise acceleration of the rotor blade.

Fig. 8 is a fragmentary top plan view, partly in section and partly broken away, of a portion of the structure shown in Fig. 3 but illustrating a modified construction.

For the purpose of illustration, the rotor tip-dampers 10, which are the subject of this invention, are shown in Fig. 1 as employed upon a common type of helicopter embodying a single main rotor 11 having a pair of opposed main blades 12—12. The rotor 11 is driven by an engine 13 mounted upon the fuselage section 14 of the craft. Power is also supplied to a torque-compensating tail rotor 15 mounted at the aft end of the tail boom 16. In the particular helicopter illustrated, control of the main rotor 11 is achieved by means of a system of the type disclosed in assignee's patent to Stanley Hiller, Jr. et al., No. 2,534,353, dated December 19, 1950. In such system, the main rotor blades 12 are universally mounted at their root or inboard ends for endwise tilting or flapping movement, and also for cyclic pitch adjustment about their longitudinal axes; and control of the rotor is effected by the aerodynamic action of a pair of control blades 17—17 which are mechanically interconnected to the pilot's control stick by means of a swash or wobble mechanism 18. However, it is to be understood that the present invention is equally applicable to other types of rotor blade control systems and mounts.

Each of the rotor blades is of the same type and construction; and such construction is employed on many manufactured ships. Hence, the control flapwise vibration will be essentially the same and can be readily determined beforehand for all such like blades. Tip-damper 10, while blending into the normal tip planform of rotor blade 12 thus forming a functional part thereof, is in reality a separate component part attached to the tip portion of the blade by means which will be described in detail later. The profile shape of each damper is contoured so as to conform closely to the normal airfoil shape of an otherwise conventional rotor blade tip portion for such blade. In fact, under conditions when no abnormal flapwise oscillations are present, damper 10 functions as an ordinary tip end of the blade and provides a normal contribution to the overall lift of the blade under rotor operating conditions.

However, if a rotor blade should start developing an undesirable flapwise vibration during flight, known beforehand from the characteristics of the blade to be critical and therefore damaging to the blade, the mechanism illustrated in Figs. 3 through 5 permits tip-damper 10 to pitch elastically, alternately up and down about a longitudinal axis 20, with respect to the main blade 12, and at a frequency which corresponds to the particular undesired vibration of the rotor blade 12. The damper is tuned or preadjusted beforehand to have a pitchwise frequency substantially equal to the known detrimental flapwise frequency of the blade. As will be described in more detail later, the pitching motion of the damper 10 at any instant is such that an aerodynamic force is created to oppose the flapwise vibration of the rotor blade.

Main rotor blade 12 may be of any known type of construction. The blade illustrated is built around a metal tubular leading edge spar 21 having a vertical web section 22. The trailing edge portion is provided with a longitudinal metal stiffener 23 extending the full length thereof. Web 22 of spar 21 is interconnected to the trailing edge stiffener 23 by means of upper and lower corrugated sheet metal strips 24 and 25; and the whole assembly is covered with a smoothly contoured skin 26 to form the aerodynamic profile of the blade.

As shown in Fig. 5, a similar type of construction is employed for tip-damper 10, wherein a tubular leading edge spar member 27 is joined to a trailing edge stiffener 28 by means of upper and lower corrugated strips 30 and 31; and the whole is covered with a metal skin 32 to form the aerodynamic profile thereof. The tip end 33 of the damper 10 is substantially closed and rounded to provide a smoothly faired aerodynamic tip shape.

A supporting mechanism 34 forming part of the tip-damper is provided; and to allow installation of mechanism 34, an outer portion of web 22 is cut away as at 35. This permits the internal mounting of a support bracket 36 upon an inboard portion of web 22. A plurality of bolts 37 secures support bracket 36 to web 22.

Support bracket 36 is provided with an integral pivot stud 38 projecting longitudinally outward along the pitching axis 20, and into the inboard end of tip-damper 10. Pivot stud 38 projects within and provides a journal for a sleeve 40 of a similar support bracket 41 which is internally mounted within tip-damper 10; the web 42 of spar 27 having been cut away as at 43 to allow clearance for insertion of support bracket 41 which is secured in position by bolts 44. Sleeve 40 is provided with bushings 45 and 46 to reduce rotational friction on pivot stud 38.

Two pairs of ears 47 and 48 are provided on support bracket 36 to which the inner ends of two parallel torsion strap units 50 and 51 are, respectively, secured by means of pin bolts 52 and 53, respectively; the bolts being mounted equidistantly from opposite sides of sleeve 40 and perpendicular thereto. The outer ends of straps 50 and 51 are similarly secured by means of the respective pin bolts 54 and 55, to two separate pairs of ears 56 and 57, respectively, which are integral parts of outer support bracket 41 mounted within tip-damper 10. Torsion straps 50 and 51 not only restrain elastically pitchwise motion of the tip-damper 10 about the axis 20 whenever the damper 10 is deflected from its neutral position due to the influence of inertia forces introduced during flapwise vibrations or oscillations of main rotor blade 12, but they also transfer the centrifugal load of damper 10 to the main body of the blade. Hence, they serve as tension-torsion members.

As shown in Figs. 3 and 4, a projecting stop pin 58 is secured to support bracket 36 for the purpose of providing a limit stop to the elastic rotational movement of the sleeve 40; such sleeve being provided with a recessed slot 59 cut into its inboard end opposite the location of pin 58, for confining and limiting relative motion between pin 58 and sleeve 40. This will prevent excessive pitching of tip-damper 10 and thus preclude the possibility of its becoming aerodynamically stalled which would only reduce its effectiveness.

Straps 50 and 51 each comprise a plurality of relatively thin sheet metal strips stacked and clamped together to form a laminated structure, as is shown at 50 and 51 in Fig. 4, providing sufficient torsional flexibility or elasticity for permitting restrained pitchwise turning or rotation of the tip-damper. The numbers of such strips in each strap and the physical characteristics and geometry of the straps are predetermined beforehand in accordance with the known detrimental flapwise vibration inherent in the blade to provide an elastic restraint in flight which will result in a natural pitchwise frequency of the damper substantially equal to the critical flapwise vibration of the blade to be absorbed. Since, as previously explained, all like blades will have substantially the same detrimental flapwise vibration in flight, once the desired extent of elastic restraint of the torsion straps has been predetermined beforehand, no further adjustment of the straps is required in the manufacturing assembly of a plurality of such like blades.

In functioning of tip-damper 10, its center of gravity should also be located forward of its pitching axis 20 to insure that the pitching of the damper will be in opposition to the flapwise vibrations of the blade and that its rotational inertia movement will substantially balance the torsional spring constant of straps 50 and 51. The precise location of such center of gravity is not particularly critical as long as it is substantially in line with or aft of the front strap 50 and ahead of the pitching axis 20. As is shown in Fig. 8 which illustrates a portion of the structure shown in Fig. 3 and to which the same reference numerals are applied to the same parts, only a single torsion strap 50 may be employed if so desired, such as by dispensing with rear strap 51 employed in the modification of Fig. 3. If so, the center of gravity should be still ahead of the pitching axis but may be located ahead of or substantially in line with such single strap 50. An adjustable system in the form of a series of cylindrically shaped slug weights 61 confined in an elongated chamber 62 at the leading edge or spar portion of tip-damper 10, provides for final adjustment of the location of the center of gravity.

Chamber 62 is closed at its inboard end by an angle 63 secured to bracket 41 as shown in Fig. 3. The aft side of the chamber 62 is bounded by a longitudinal channel 64 secured internally to the spar 27 of damper 10; and the outboard end of the chamber 62 is bounded by a spar cap 65 which absorbs the centrifugal loads of weights 61. A removable threaded plug 66 in spar cap 65 serves to allow introduction and adjustment of the number of weights 61 confined in the chamber 62. A compression spring 67 is also provided to bear against the inboard end of the series of weights 61, and thus prevent them from shifting axially, while the weights are confined between the leading edge of damper and the channel 64 to preclude chordwise shifting. The center of gravity is indicated by C.G. in Fig. 6.

In operation, if tip-damper 10 is subjected to a vertically applied upward accelerating force, such as that represented by the straight arrow passing through pivot stud 38 in Fig. 6, the inertia force of the center of gravity C.G. will be displaced from and will be in opposition to the above mentioned applied input force and will thus create a couple tending to cause the damper 10 to rotate clockwise as indicated by the curved arrow in Fig. 6. This inertia couple, which arises from vibrational flapping or fluttering of the rotor blade may be regarded mathematically as a forcing function, and the resultant angular displacement of the tip-damper 10 will lag the rotor blade displacement by 90 degrees. This is clearly illustrated in Fig. 7 wherein is shown a series of end views of a rotor blade 12 passing through a complete cycle of flapping motion, and showing the tip-damper 10 (with shade lines) being angularly displaced with respect to the rotor blade 12.

While the rotor blade 12 has flapped upwardly to its position of maximum displacement at station B, the maximum nose-up pitching of tip-damper 10 does not take place until 90° later when the rotor blade is passing through its zero-displacement position at station C. However, immediately after passing station C the rotor blade begins to decelerate downwardly (i.e. accelerate upwardly) as shown by the rotor blade acceleration curve at the lower portion of Fig. 7. The inertia couple generated by the upward acceleration which begins at this point, i.e., station C (and which is of the character illustrated in Fig. 6), will consequently initiate a reversal in the direction of the pitchwise motion of tip-damper 10. Such reversing couple ensues during the entire next 180° to station A' (i.e. as long as the acceleration is upward) so that maximum angular displacement of the tip-damper is again achieved at station A' but in the opposite or nose-down pitching attitude. Meanwhile, the damper 10 has passed through a zero pitch attitude at station D at the same time that the rotor blade 12 flapped to its maximum downward displacement. Following this, the rotor blade 12 again starts flapping upwardly and the damper 10 continues its nosing-down tendency and begins to assume a negative angle of attack, such as at station X where the attitude shown is a duplication of Fig. 6.

A study of the above described tip-damper motion reveals that whenever the rotor blade 12 is flapping with a downward motion, the tip-damper 10 is at a positive angle of attack so that the aerodynamic forces on the tip damper are in opposition to the flapping motion of the rotor blade. A similar but opposite set of conditions exist when the rotor blade is flapping upwardly.

It is thus apparent that the auxiliary damper-tips 10 will function as a damper to reduce the amplitude of the rotor blades' flapwise oscillations and hence reduce the stresses arising from a resonant vibrational condition. In this connection, the pitching axis 20 of tip-damper 10 is desirably located chordwise at the aerodynamic center (i.e., center of the pressure) of the damper so that the air loads imposed upon the damper during its operation will have little or no tendency to influence the oscillatory pitchwise movements generated in the damper by the inertia forces previously described.

I claim:

1. A rotary wing aircraft rotor blade having a main body portion and a damper portion spaced outwardly with reference to the root end of said body portion, means mounting said damper portion on said main body portion for oscillation in either direction about an axis extending substantially longitudinally of said blade, said axis being located substantially within the confines of the airfoil contour of the blade, and means interconnected between parts of said main body portion and said damper portion for resiliently restraining said damper portion oscillation, the center of gravity of said damper portion being located forward of said longitudinal axis of oscillation.

2. A rotary wing aircraft rotor blade having a main body portion and a damper portion which forms the tip end of said blade, said damper portion being of airfoil shape conforming substantially to and providing an extension of the airfoil shape of said body portion, means mounting said damper portion on said main body portion for oscillation in either direction about an axis extending substantially longitudinally of said blade, said axis being located substantially within the confines of the airfoil contour of the blade, and means interconnected between parts of said main body portion and said damper portion for resiliently restraining said damper portion oscillation, the center of gravity of said damper portion being located forward of said longitudinal axis of oscillation.

3. A rotary wing aircraft rotor blade having a main body portion and a damper portion which forms the tip end of said blade, said damper portion being of airfoil shape conforming substantially to and providing an extension of the airfoil shape of said body portion, means mounting said damper portion on said main body portion for oscillation in either direction about an axis extending substantially longitudinally of said blade, said axis being located substantially within the confines of the airfoil contour of the blade, and means including a torsion member extending longitudinally with respect to and spaced chordwise from said axis of oscillation and interconnected between parts of said main body portion and said damper portion for resiliently restraining said damper portion oscillation, the center of gravity of said damper portion being located forward of said longitudinal axis of oscillation.

4. The blade of claim 3 in which said torsion member is a laminated structure comprising sheet metal strips.

5. A rotary wing aircraft rotor blade having a main body portion and a damper portion which forms the tip end of said blade, said damper portion being of airfoil shape conforming substantially to and providing an extension of the airfoil shape of said body portion, means mounting said damper portion on said main body portion for oscillation in either direction about an axis extending substantially longitudinally of said blade, said axis being located substantially within the confines of the airfoil contour of the blade, means interconnected between parts of said main body portion and said damper portion for resiliently restraining said damper portion oscillation, the center of gravity of said damper portion being located forward of said longitudinal axis of oscillation, and said axis of oscillation being located substantially at the aerodynamic center of said damper portion.

6. A rotary wing aircraft rotor blade having a main body portion and a damper portion which forms the tip end of said blade, means mounting said damper portion on said main body portion for oscillation in either direction about an axis extending substantially longitudinally of said blade, said axis being located substantially within the confines of the airfoil contour of the blade, and means interconnected between parts of said main body portion and said damper portion for resiliently restraining said damper portion oscillation, said damper portion having adjusted weight means forward of said axis of oscillation locating the center of gravity of said damper portion forward of said axis of oscillation.

7. In a rotary wing aircraft, a rotor comprising a plurality of rotor blades, each blade having a main body portion and a damper portion which forms the tip end of such blade, means mounting each damper portion of each blade on its associated main body portion for oscillation in either direction about an axis extending substantially longitudinally of the blade, said axis being located substantially within the confines of the airfoil contour of the blade, each damper portion being of airfoil shape conforming substantially to and providing an end extension of the airfoil shape of said body portion, means interconnected between parts of the main body portion and the damper portion of each blade for resiliently restraining the damper portion oscillation, the center of gravity of each damper portion being located forward of its longitudinal axis of oscillation, and each damper portion and the means interconnecting the same with its associated main body portion being tuned to have a restrained pitchwise frequency substantially equal to a detrimental flapwise vibration inherent in the blade to dampen the same.

8. A rotary wing aircraft rotor blade having a main body portion and a damper portion which forms part of the blade as a whole, said damper portion providing the tip end of the blade and being of airfoil shape conforming substantially to and providing an end extension of the airfoil shape of said body portion, means free of pilot control connecting means mounting said damper portion on said main body portion for oscillation in either direction about an axis extending substantially longitudinally of said blade, said axis being located substantially within the confines of the airfoil contour of the blade, and means interconnected between parts of said main body portion and said damper portion for resiliently restraining said damper portion oscillation, the center of gravity of said damper portion being located forward of said longitudinal axis of oscillation.

References Cited in the file of this patent

UNITED STATES PATENTS

| | | |
|---|---|---|
| 1,537,401 | Blumschein | May 12, 1925 |
| 1,990,291 | Larsen | Feb. 5, 1935 |
| 2,074,149 | Jacobs | Mar. 16, 1937 |
| 2,151,216 | Larsen | Mar. 21, 1939 |
| 2,380,583 | Cierva | July 31, 1945 |
| 2,397,132 | Dent | Mar. 26, 1946 |
| 2,455,866 | Kaman | Dec. 7, 1948 |

FOREIGN PATENTS

| | | |
|---|---|---|
| 438,111 | Great Britain | Nov. 12, 1935 |